(12) United States Patent
Denning

(10) Patent No.: US 9,309,640 B2
(45) Date of Patent: Apr. 12, 2016

(54) RAPID DEPLOYMENT OIL RECOVERY APPARATUS

(71) Applicant: Doug Denning, Richland, WA (US)

(72) Inventor: Doug Denning, Richland, WA (US)

(*) Notice: Subject to any disclaimer, the term of this patent is extended or adjusted under 35 U.S.C. 154(b) by 0 days.

(21) Appl. No.: 14/152,856

(22) Filed: Jan. 10, 2014

(65) Prior Publication Data

US 2015/0197906 A1  Jul. 16, 2015

(51) Int. Cl.
 *E02B 15/04* (2006.01)
 *E02B 15/00* (2006.01)
(52) U.S. Cl.
 CPC ............ *E02B 15/04* (2013.01); *E02B 2015/005* (2013.01)
(58) Field of Classification Search
 USPC ............ 405/52, 60, 63, 64, 70, 210; 166/364; 210/170.11, 170.09, 747.5
 See application file for complete search history.

(56) References Cited

U.S. PATENT DOCUMENTS

2011/0318106 A1* 12/2011 Gateff et al. .................... 405/60

* cited by examiner

*Primary Examiner* — Sean Andrish
(74) *Attorney, Agent, or Firm* — Floyd E. Ivey

(57) ABSTRACT

The invention is a rapid deployment oil recovery apparatus (1) comprising a number of interconnected oil recovery sections, denoted as 1–n interconnected oil recovery sections (100) comprised of a fabric or flexible material. An oil accumulator (200) is distal from the breach and an oil interceptor (300) is secured at the breach. Compression tubes (500) at the outer circumference of an oil recovery section (100) seal a leak in the oil recovery section (100) and provide lift to the oil recovery section (100). The 1–n compression tubes (500) and the compression tube sections (550) are positioned by compression tube control lines (555). An air manifold frame (150) is within the oil interceptor (300) and is comprised of air manifold frame first section (153) and 1–n air manifold frame sections (155) comprising an air manifold (160) having an air manifold fluid supply (163). Buoys (700) retain the position of the rapid deployment oil recovery apparatus (1) by interconnection of a position retaining line (710) from the buoy (700). A fluid transmission tube (910) connects with a container vessel (900).

5 Claims, 8 Drawing Sheets

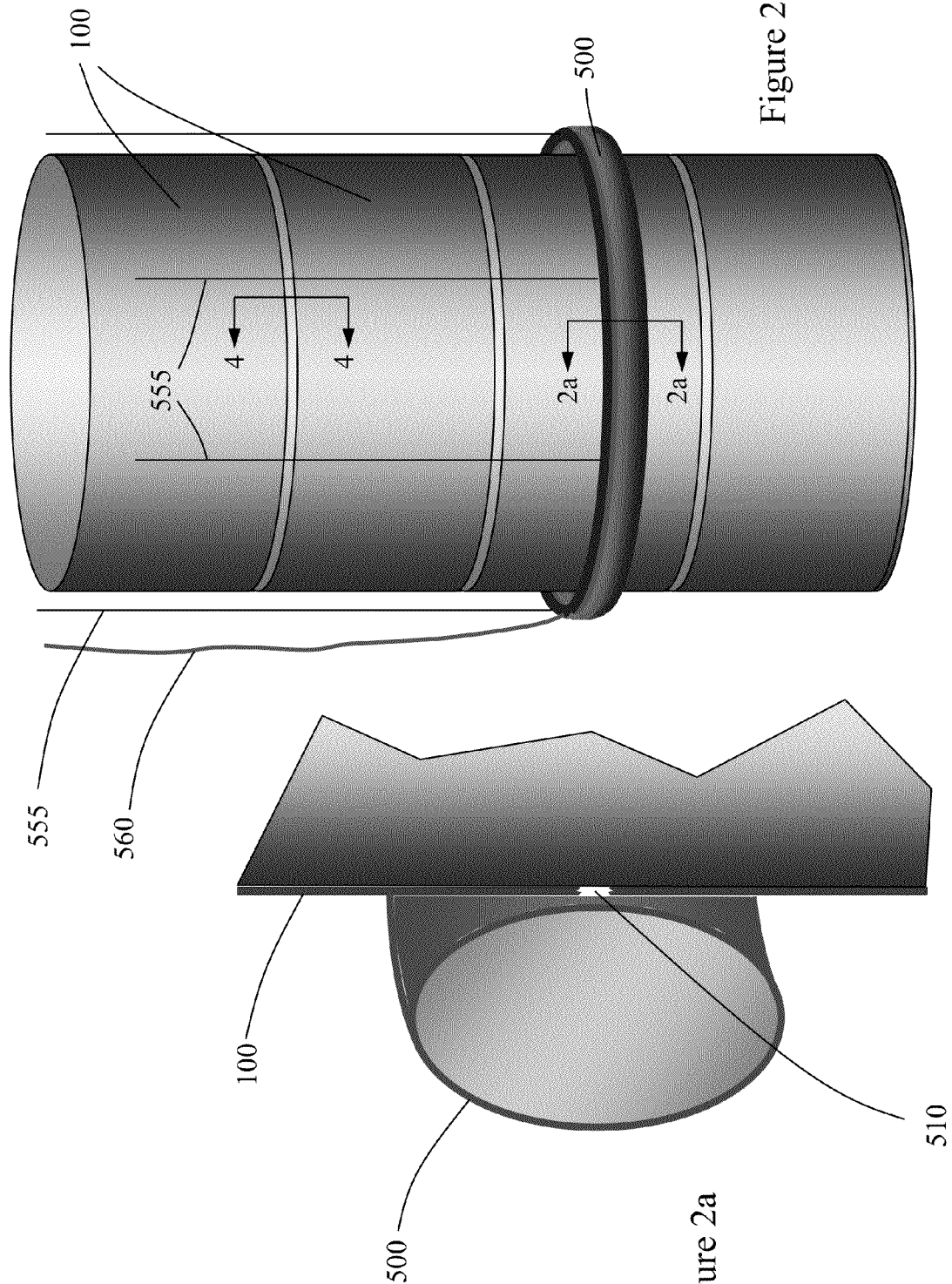

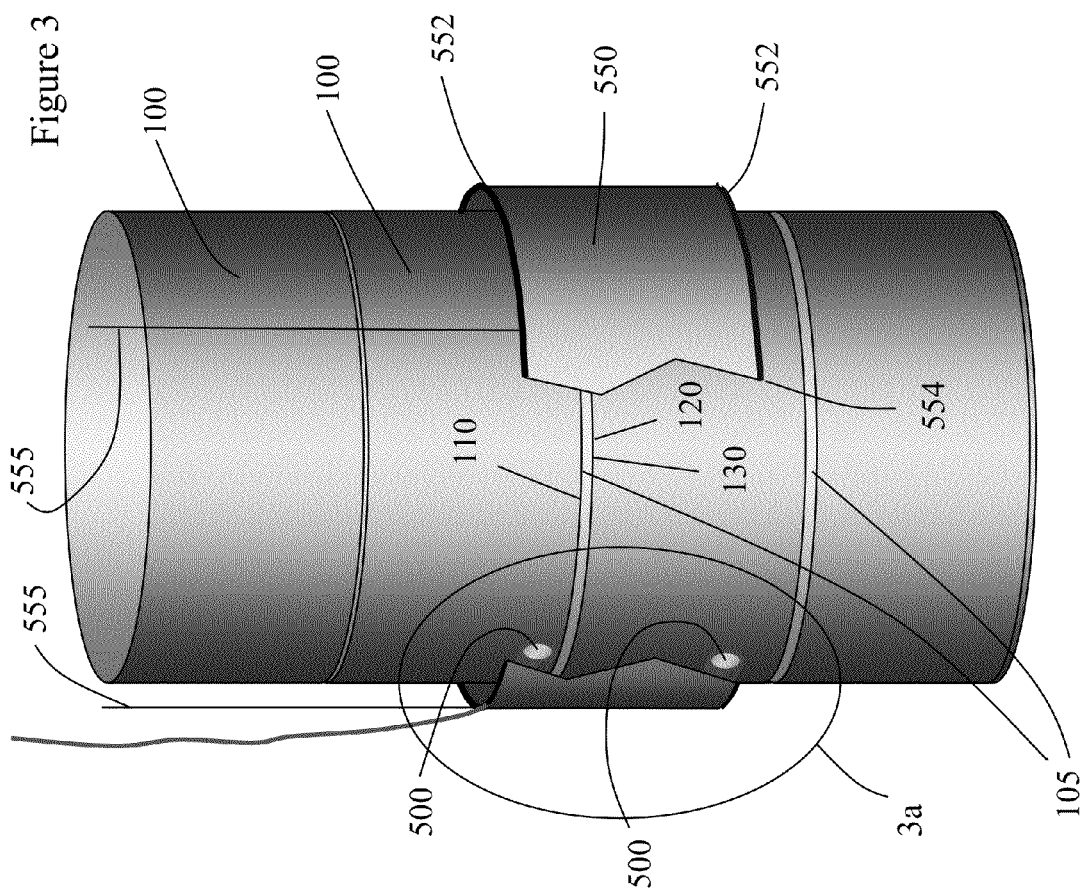
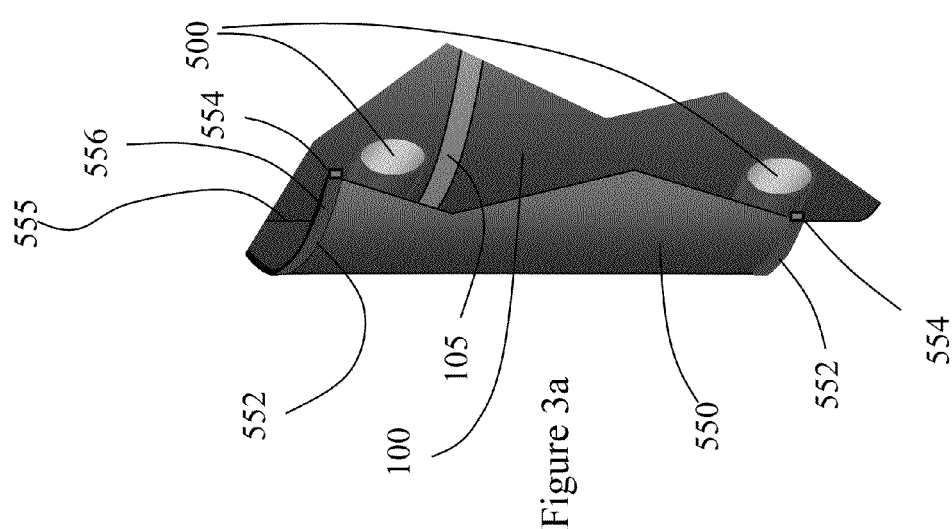

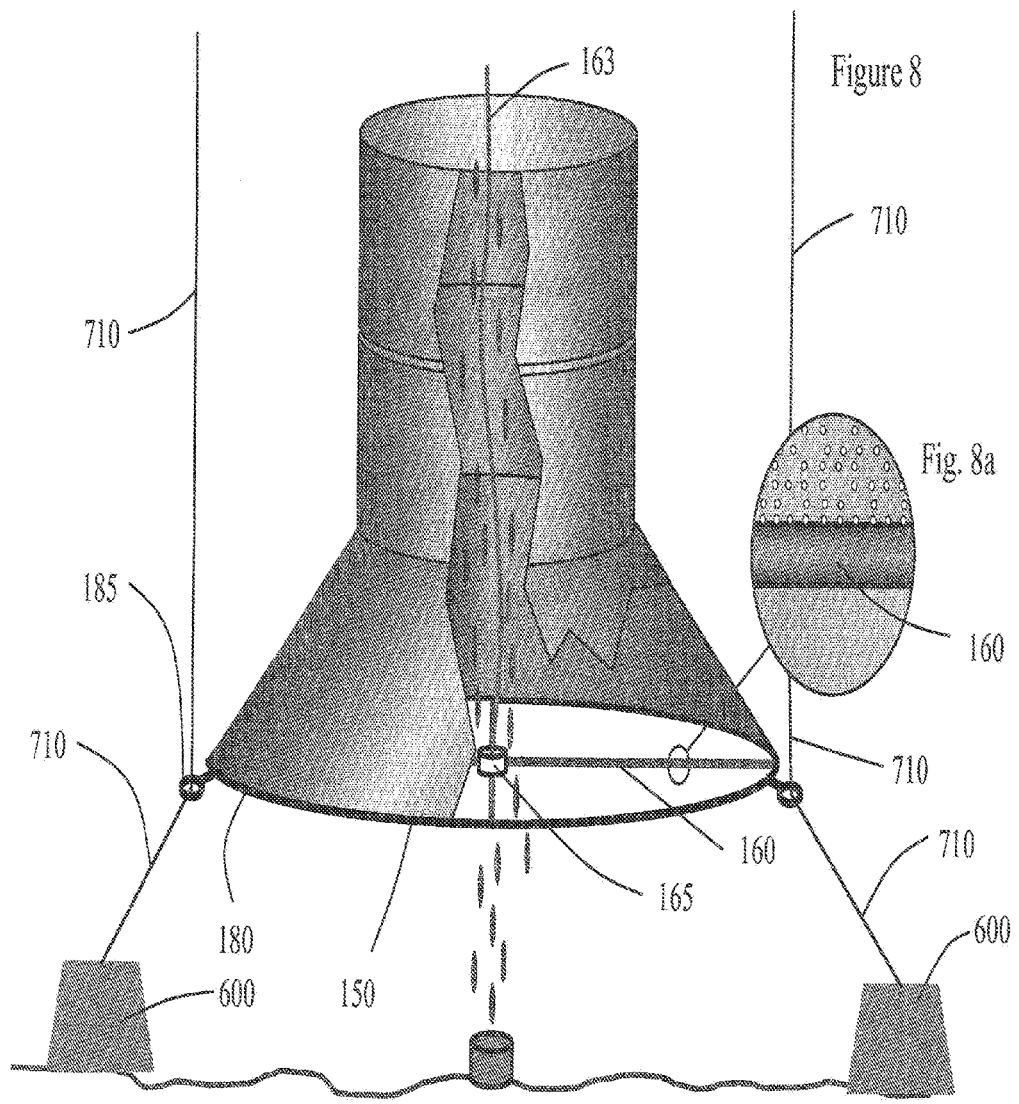

RAPID DEPLOYMENT OIL RECOVERY APPARATUS

FIELD OF THE INVENTION

This invention relates to a piping apparatus for transport of oil from a ruptured or damaged underwater well mechanism to a container vessel. More specifically the invention is a piping apparatus which is rapidly assembled and deployed at a leaking underwater oil well or oil well structure for transport of the leaking oil to a container.

BACKGROUND OF THE INVENTION

The unintentional discharge of a liquid or fluid may require a means of recovery.

A variety of tube like structures are found in the literature intended for the recovery of or interception of oil spills. This invention claims a rapidly deployable structure to be used to intercept and transport oil from the site of a breach to a container.

SUMMARY OF THE INVENTION

The invention is a rapid deployment oil recovery apparatus (1) for use in the recovery of oil from an underwater well breach. The apparatus comprises a number of interconnected oil recovery sections, denoted as 1–n interconnected oil recovery sections (100) comprised of a fabric or flexible material. An oil accumulator (200) is most distal from the breach and an oil interceptor (300) is secured at the breach to encompass and enclose the oil escaping from the breach. Compression tubes (500) at the outer circumference of an oil recovery section (100) seal a leak in the oil recovery section (100) and provide life to the oil recovery section (100). The 1–n compression tubes (500) and the compression tube sections (550) are positioned at the desired location of the apparatus by compression tube control lines (555). An air manifold frame (150) is within the oil interceptor (300) and is comprised of air manifold frame first section (153) and 1–n air manifold frame sections (155) comprising an air manifold (160) having an air manifold fluid supply (163). Buoys (700) retain the position of the rapid deployment oil recovery apparatus (1) by interconnection of a position retaining line (710) from the buoy (700). A fluid transmission tube (910) connects with a container vessel (900).

BRIEF DESCRIPTION OF THE FIGURES

The foregoing and other features and advantages of the present invention will become more readily appreciated as the same become better understood by reference to the following detailed description of the preferred embodiment of the invention when taken in conjunction with the accompanying drawings, wherein:

FIGS. 2, 2A, 3 and 3a show oil recovery section (100), joint structure (105), upper joint section (110), intermediate joint section (130) and lower joint section (120). Also seen is compression tube (500), oil recovery section leak (510), compression tube section (550), compression tube section rib (552), compression tube joint (554), compression tube control line (555), control line affixing devices (556) and compression tube inflation tube (560). Seen in FIG. 2a, a section view 2a-2a from FIG. 2, is the position of the compression tube (500) relative to an oil recovery section leak (510). Seen in cut-away views at FIGS. 3 and 3a, is the positioning of the compression tube section (550) and "n" compression tubes (500) relative to an oil recovery section leak (510) shown in FIG. 2a.

FIG. 5 and FIG. 5a, a section view from FIG. 5, illustrates the air manifold frame (150), consisting of a air manifold frame first section (153) and at least one air manifold frame n sections (155). Seen in FIG. 5a is the air manifold frame connection (152) connecting the air manifold frame (150) at the air manifold frame first section (153) and the at least one air manifold frame n section (155) with a joint connector (140) and an air manifold joint section (170).

FIG. 6a illustrates the air manifold bracket (162) connecting the air manifold (160) to the air manifold frame (150).

FIGS. 8 and 8a shows a cutaway and detail view of the rapid deployment oil recovery apparatus (1) proximal the oil interceptor (300) illustrating anchors (720) and the air manifold frame (150), perforated air manifold (160), air manifold fluid supply (163) and air manifold interconnect (165). FIG. 8a is a detail from FIG. 8 illustrating perforations in the perforated air manifold (160).

DETAILED DESCRIPTION OF THE INVENTION

Figure 1:
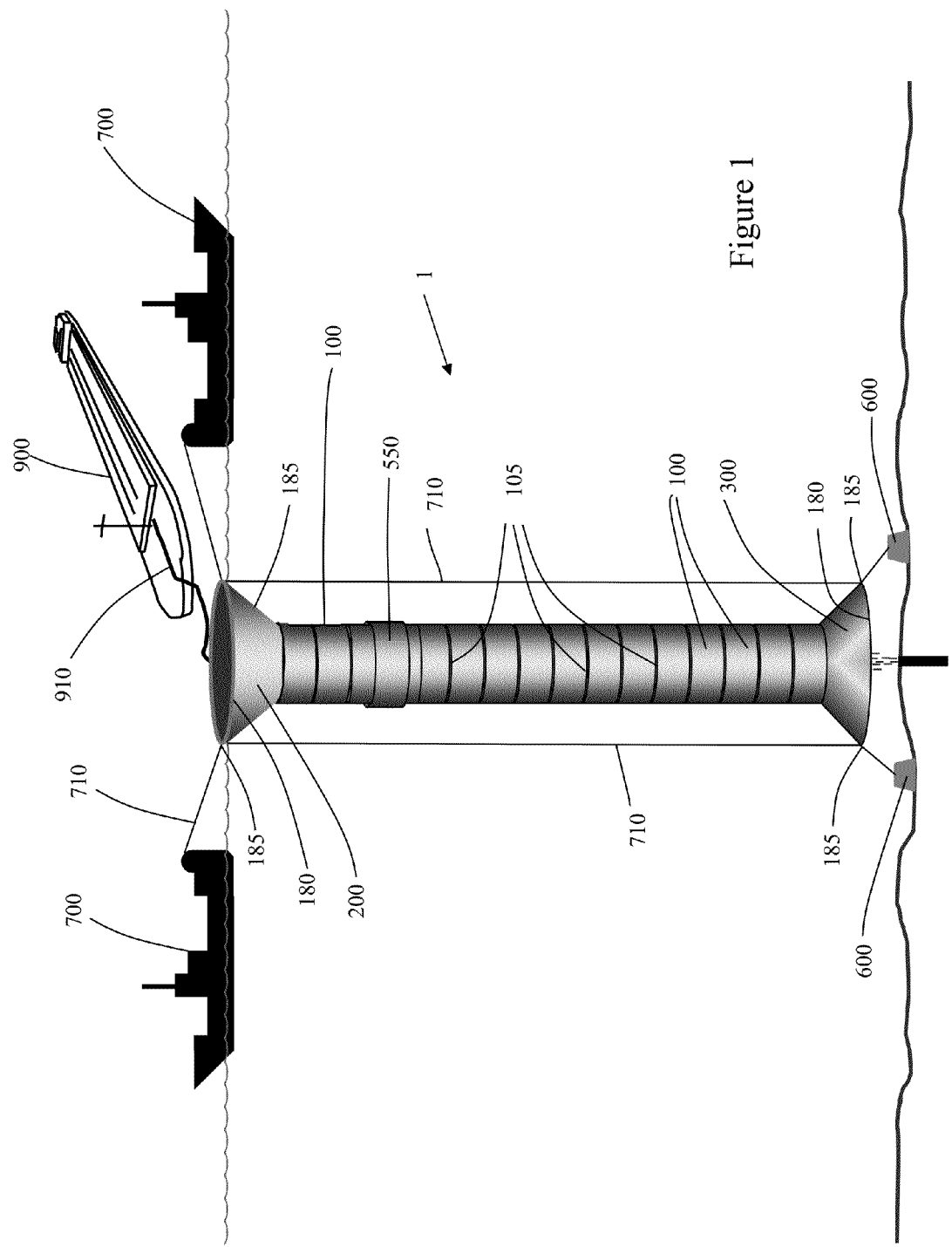
FIG. 1 illustrates the rapid deployment oil recovery apparatus (1) showing oil recovery sections (100), joint structure (105), oil accumulator (200), oil interceptor (300), compression tube section (550). Also seen is the oil accumulator (200) and oil interceptor (300), position retaining line (710) and anchor (600). Also illustrated is a container vessel (900), fluid transmission tube (910) and buoys (700).
Figure 4:
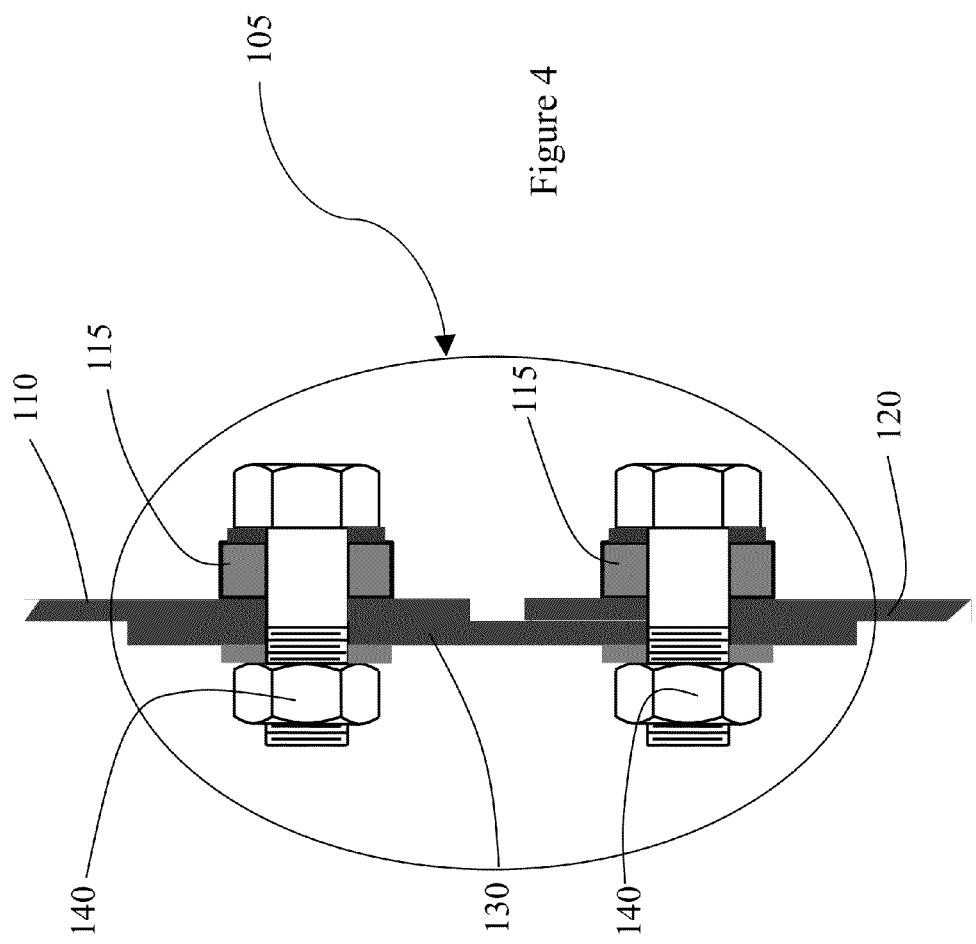
FIG. 4 is a section 4-4 from FIG. 2 which shows the joint structure (105) comprising an upper joint section (110), an intermediate joint section (130) and a lower joint section (120) interconnected by a joint connector (140) and a joint band (115).
Figure 5:
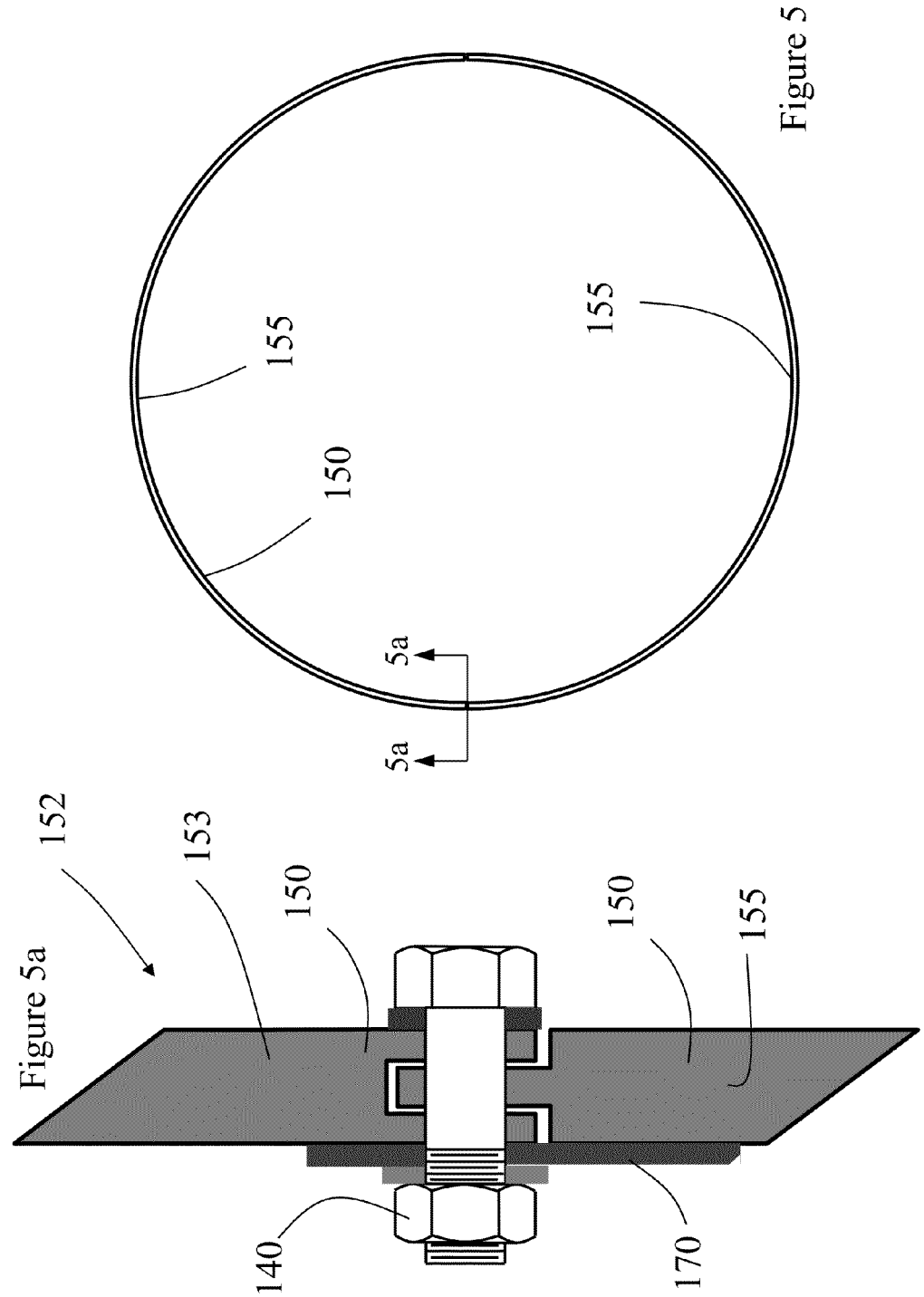
Figure 6:
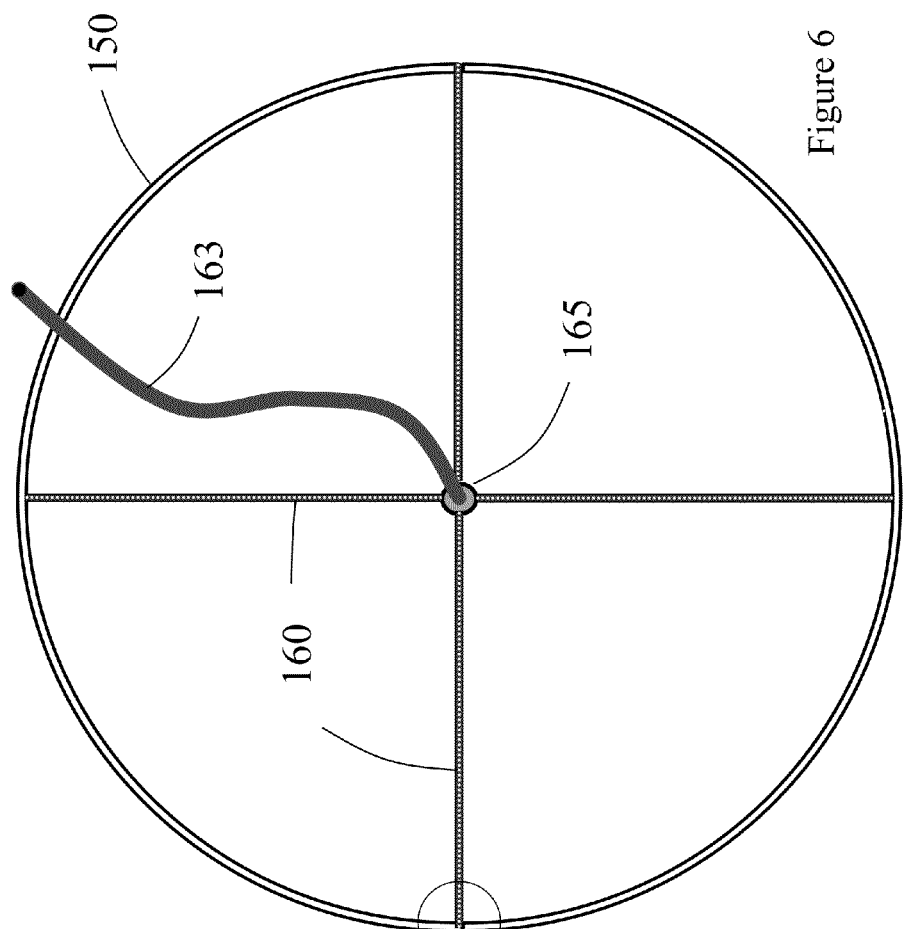
FIG. 6 and FIG. 6a show the air manifold frame (150) connected to the air manifold (160) having an air manifold fluid supply (163) with an air manifold interconnect (165).
Figure 6A:
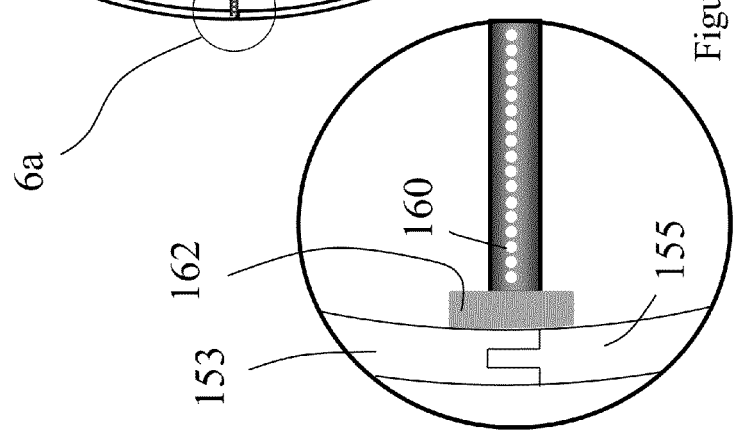
Figure 7:
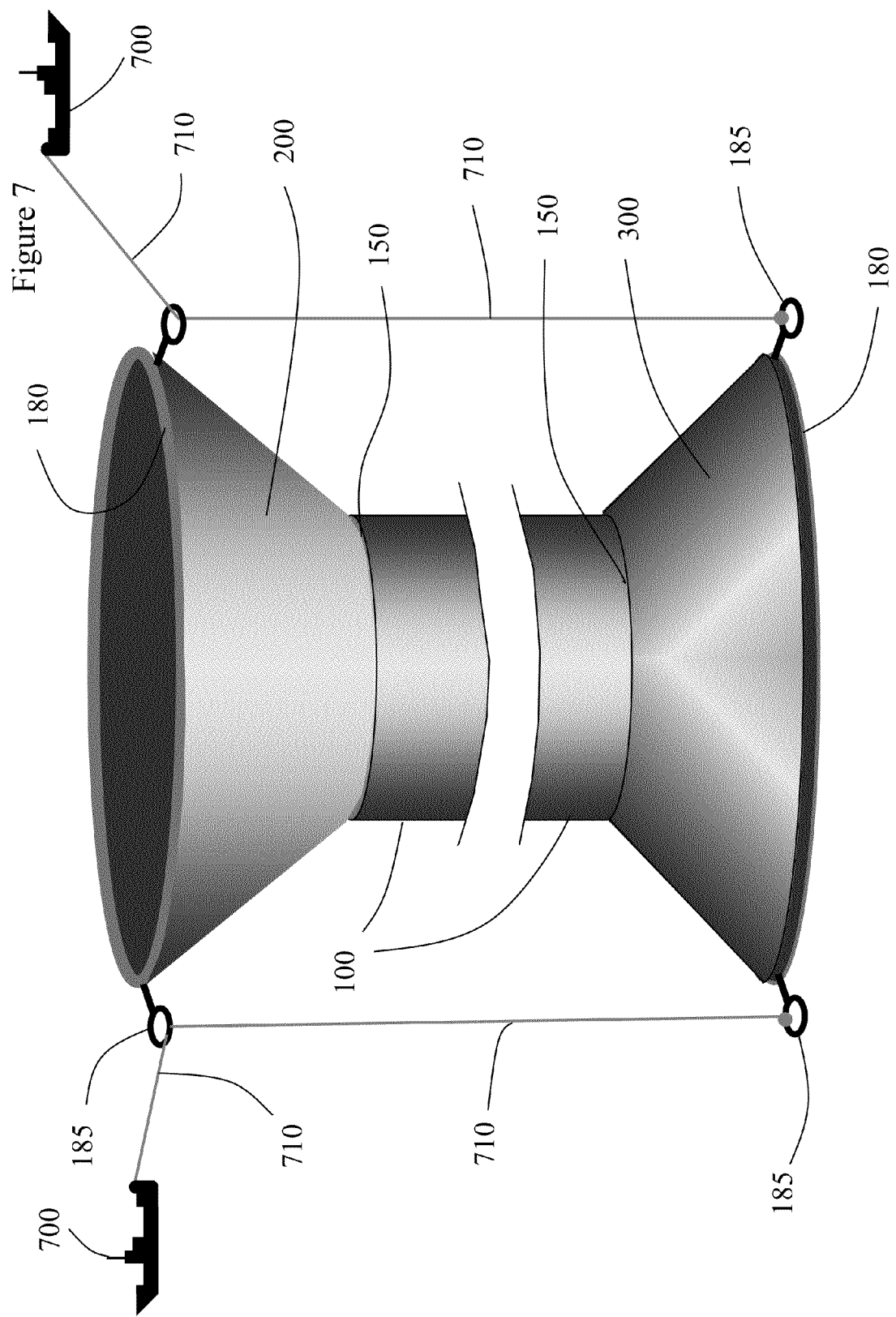
FIG. 7 shows rapid deployment oil recovery apparatus (1) in a breakaway view illustrating an oil accumulator (200) connected to an oil recovery section (100) with a joint structure (105) interconnecting the oil accumulator (200) and an oil recovery section (100). Also seen is an oil interceptor (300) connected to an oil recovery section (100) with a joint structure (105). Illustrated are position retaining line connector devices (185) affixed to the oil accumulator (200) and to the oil interceptor (300), position retaining lines (710) and buoys (700).

The invention is a rapid deployment oil recovery apparatus (1) for use in the recovery of oil from an underwater well breach. The apparatus comprises at least one oil recovery section (100), and as is recognized by those of ordinary skill in the oil recovery arts, 1–n oil recovery sections (100) will be utilized depending on the depth of the breach; the at least one oil recovery section (100) is comprised of a fabric or flexible material, and in the preferred embodiment of this invention the fabric or flexible material is Kevlar® or Kevlar® KM2® which is known generically as "kevlar".

The 1–n oil recovery sections (100) are affixed together by a joint structure (105); the said joint is comprised of an upper joint section (110), an intermediate joint section (130) and a lower joint section (120); a rigid joint band (115) is positioned proximal an overlapping portion of the said upper joint section (110) and the said intermediate joint section (130); the rigid joint band (115) may be tubular or solid in a variety of cross sections including circular and rectangular; at least one joint connector (140) comprised in the preferred embodiment of a nut/bolt connection but which may be formed of other joint connectors known to those of ordinary skill in the connection arts, secures the joint band (115) and the said upper joint section (110) and the said intermediate joint section (130).

The same type of connection is made for the intermediate joint section (130) and the lower joint section (120). A rigid joint band (115) is positioned proximal an overlapping portion of the said lower joint section (120) and the said intermediate joint section (130); at least one joint connector (140), comprised in the preferred embodiment of a nut/bolt connection or other joint connectors known to those of ordinary skill in connections, secures the joint band (115) and the said lower joint section (120) and the said intermediate joint section (130).

An oil accumulator (200) is most distal from the breach and an oil interceptor (300) is most distal to the oil accumulator (200); the said oil interceptor (300) is secured at the breach to encompass and enclose the oil escaping from the breach; the said oil accumulator (200) and the said oil interceptor (300) are affixed by a joint structure (105) to the adjacent oil recovery section (100).

At least one compression tube (500), and in the preferred embodiment 1–n compression tubes (500), are affixed at the outer circumference of an oil recovery section (100) for the purpose of sealing a leak in the oil recovery section (100) or in providing lift to the oil recovery section (100); the 1–n compression tubes (500) are tubular and are filled with a fluid. Where the intent is to seal an oil leak the fluid, in the preferred embodiment is water. Where the intent is to provide life the fluid may be air. The at least one compression tube (500) is positioned to cover a leak with said compression tube (500) being of an inside circumference that allows positioning of the said compression tube (500) in compression and leak stopping contact with the leak at the outer circumference of the oil recovery section (100) where the leak exists.

In an alternative embodiment said leak control is effected by use of a compression tube section (550) comprised of at least two compression tube section ribs (552) with each of said at least two compression tube section ribs joined with a compression tube joint (554). Said compression tube joint (554) comprises affixing the said compression tube section rib (552) to a compression tube section (550) with a joint connector (140).

The 1–n compression tubes (500) and the compression tube section (550) are positioned at the desired location of the apparatus by at least one compression tube control line (555), and in the preferred embodiment by 1–n compression tube control lines (555) affixed, by control line affixing devices known by those of ordinary skills in control line affixing arts, to the 1–n compression tubes (500) and the compression tube section (550). Compression tube control lines are elongated, flexible and with a tensile strength sufficient to support the said compression tubes. The control lines may be composed of plastic, metals and may be cables.

In this alternative embodiment each of the said compression tube sections (550) contains at least two compression tube inflation tubes (560) with one compression tube inflation tube (560) affixed by inflation tube (560) affixing devices to the compression tube section (550) most proximal to the oil accumulator (200) and with one compression tube inflation tube (560) affixed by inflation tube (560) affixing devices to the compression tube section (550) most proximal to the said oil interceptor (300).

The 1–n compression tubes (500) and the compression tube section (550) are positioned at the desired location of the apparatus by at least one compression tube control line (555), and in the preferred embodiment by 1–n compression tube control lines (555) affixed, by control line affixing devices, to the 1–n compression tubes (500) and the compression tube section (550).

A compression tube inflation tube (560) is affixed by inflation tube (560) affixing devices to each 1–n compression tube (500) as air or water supply for said compression tube (500).

An air manifold frame (150) is positioned within the oil interceptor (300) at an oil interceptor (300) inside circumference proximal to the breach; the said air manifold frame (150) is comprised of at least an air manifold frame first section (153) and 1–n air manifold frame n sections (155) comprising an air manifold frame (150). An air manifold (160) has an air manifold fluid supply (163) and is interconnected by an air manifold interconnect (165) interconnecting 1–n air manifold joint sections (170); said 1–n air manifold joint sections (170) are stably affixed, by joint section affixing devices, to said air manifold frame (150) with a air manifold joint section (170) bracket device known to those of ordinary skill in the bracket arts. The said 1–n air manifolds (160) are perforated.

At least one buoy (700), and in the preferred embodiment at least 1–n buoys (700) retain the position of the rapid deployment oil recovery apparatus (1) by interconnection of a position retaining line (710) from the at least one buoy (700) and retained in tension by said at least one buoy (700) to a position retaining line (710) affixed by position retaining line connector devices (185), including eye-bolts, affixed to a stabilizing frame (180) affixed by frame affixing devices, including brackets known to those of ordinary skills in the bracket arts, at a oil accumulator circumference (210); the position retaining line (710) is affixed by position retaining line connector devices (185), including eye-bolts, affixed to a stabilizing frame affixed by frame affixing devices at a oil interceptor circumference (310) of the said oil interceptor (300).

At least one fluid transmission tube (910) is in fluid transmission connection with a container vessel (900).

The patents and publications referred to herein are provided herewith in an Information Disclosure Statement in accordance with 37 CFR 1.97.

The invention claimed is:

1. A rapid deployment oil recovery apparatus (1) comprising:
at least one oil recovery section (100); an oil accumulator (200) is most distal from an oil breach; an oil interceptor (300) is most distal to the oil accumulator (200); and
the at least one oil recovery section (100) is affixed to the oil accumulator (200) by a joint structure (105) and is affixed to said oil interceptor (300) by a joint structure (105); and
at least one buoy (700) retains the position of the rapid deployment oil recovery apparatus (1) by interconnection of a position retaining line (710) from the at least one buoy (700) and is retained in tension by said at least one buoy (700) to a position retaining line connector (720) affixed by position retaining line connector devices (185), including eye-bolts, affixed to a stabilizing frame (180) affixed by frame affixing devices at an oil accumulator circumference (210); the position retaining line (710) affixed by the position retaining line connector devices (185), including the eye-bolts, affixed to the stabilizing frame affixed by the frame affixing devices at an oil interceptor circumference (310) of said oil interceptor (300); the position retaining line (710) affixed to at least one anchor (600) proximal the oil interceptor (300); and
at least one compression tube (500) is affixed at an outer circumference of an oil recovery section (100) for the purpose of sealing a leak (510) in the at least one oil recovery section (100) or in providing lift to the at least one oil recovery section (100); and an air manifold frame (150) is positioned within the oil interceptor (300) at an oil interceptor (300) inside circumference proximal to the breach;

at least one fluid transmission tube (910) is in fluid transmission connection between said oil accumulator (200) and a container vessel (900).

2. The apparatus of claim 1 further comprising:

the at least one oil recovery section (100) comprised of 1–n oil recovery sections (100) which are comprised of a flexible material;

each of said joint structures (105) is comprised of an upper joint section (110), an intermediate joint section (130) and a lower joint section (120); a rigid joint band (115) is positioned proximal an overlapping portion of said upper joint section (110) and said intermediate joint section (130); at least one joint connector (140) secures the joint band (115) and said upper joint section (110) and said intermediate joint section (130); and the rigid joint band (115) is positioned proximal an overlapping portion of said lower joint section (120) and said intermediate joint section (130); the at least one joint connector (140) secures the joint band (115) and said lower joint section (110) and said intermediate joint section (130);

said oil interceptor (300) is secured at the breach to encompass and enclose the oil escaping from the breach; said oil accumulator (200) and said oil interceptor (300) are conical and are affixed by a joint structure (105) to the adjacent oil recovery section (100).

3. The apparatus of claim 2 further comprising:

the at least one oil recovery section (100); the oil accumulator (200) and said oil interceptor (300) are comprised of a fabric; the rigid joint band (115) may be tubular or solid in a variety of cross sections including circular and rectangular; the at least one joint connector (140) are composed of a nut/bolt connection; and the at least one compression tube (500) is tubular and is filled with a fluid and positioned to cover the leak (510) with said at least one compression tube (500) being of an inside circumference that allows positioning of the at least one compression tube (500) in compression and leak stopping contact with said leak (510) at the outer circumference of the at least one oil recovery section (100) where the leak (510) exists;

a compression tube inflation tube (560) is affixed by inflation tube (560) affixing devices to each compression tube (500) as air or water supply for said at least one compression tube (500);

said air manifold frame (150) is comprised of at least an air manifold frame first section (153) and 1–n air manifold frame sections (155); an air manifold (160) having an air manifold fluid supply (163) and interconnected by an air manifold interconnect (165) interconnecting 1–n air manifold joint sections (170) to said air manifold frame (150) at the 1–n air manifold joint sections (170) with at least one bracket (162) at each of said air manifold joint sections (170); said air manifold (160) is perforated; and the at least one buoy (700) is at least 1–n buoys (700).

4. The apparatus of claim 3 further comprising:

the flexible material is Kevlar® or Kevlar® KM2® or polyparaphenylene terephthalamide; the at least one compression tube (500) is 1–n compression tubes (500); and, said leak control is effected by use, at each leak (510) site, of a compression tube section (550) comprised of at least two compression tube section ribs (552); each of said at least two compression tube section ribs are joined with a compression tube joint (554); said compression tube joint (554) comprises affixing the said compression tube section ribs (552) to the compression tube section (550) with the at least one joint connector (140);

the 1–n compression tubes (500) and the compression tube section (550) are positioned at the desired location of the apparatus by 1–n compression tube control lines (555) affixed, by control line affixing devices, to the 1–n compression tubes (500) and the compression tube section (550);

said compression tube section (550) contains at least two compression tube inflation tubes (560) with one of the at least two compression tube inflation tubes (560) affixed by inflation tube (560) affixing devices to the compression tube section (550) most proximal to the oil accumulator (200) and with one of the at least two compression tube inflation tubes (560) affixed by inflation tube (560) affixing devices to the compression tube section (550) most proximal to the said oil interceptor (300).

5. The apparatus of claim 4 further comprising:

the 1–n compression tubes (500) and the compression tube section (550) are positioned by the 1–n compression tube control lines (555) affixed, by the control line affixing devices, to the 1–n compression tubes (500) and the compression tube section (550).

\* \* \* \* \*